United States Patent
Krauter et al.

[11] Patent Number: 6,142,751
[45] Date of Patent: Nov. 7, 2000

[54] HYDRAULIC UNIT FOR A VEHICLE BRAKE SYSTEM

[75] Inventors: Michael Krauter, Untermaiselstein; Nikolaus Proebsting, Sulzberg, both of Germany; Marc Finger; James J. Lundy, Jr., both of Charleston, S.C.; Ron Angle, Ladson, S.C.

[73] Assignee: Robert Bosch GmbH, Stuttgart, Germany

[21] Appl. No.: 09/092,178

[22] Filed: Jun. 5, 1998

[30] Foreign Application Priority Data

Jun. 7, 1997 [DE] Germany .............................. 197 24 166

[51] Int. Cl.$^7$ ....................................................... F04B 35/02
[52] U.S. Cl. ........................ 417/415; 417/540; 303/119.4
[58] Field of Search ................................... 417/415, 439, 417/540; 92/86, 72; 303/10, 119.4

[56] References Cited

U.S. PATENT DOCUMENTS

| 2,697,403 | 12/1954 | Benedek | 92/72 X |
|---|---|---|---|
| 5,009,581 | 4/1991 | Kushiyama et al. | 417/540 |
| 5,354,187 | 10/1994 | Holland et al. | 417/540 |
| 5,567,128 | 10/1996 | Volz et al. | 417/540 X |
| 5,658,056 | 8/1997 | Rischen et al. | 303/119.2 |
| 5,975,653 | 11/1999 | Zaviska | 303/116.4 |

FOREIGN PATENT DOCUMENTS

| 0 699 571 A1 | 3/1996 | European Pat. Off. . |
|---|---|---|
| 0 621 836 B1 | 3/1997 | European Pat. Off. . |

Primary Examiner—Timothy S. Thorpe
Assistant Examiner—David J. Torrente
Attorney, Agent, or Firm—Ronald E. Greigg; Edwin E. Greigg

[57] ABSTRACT

A hydraulic unit for a vehicle brake system that enables limiting wheel brake slip is known. To that end, the hydraulic unit has at least one piston pump, which is drivable by an electric motor and empties a reservoir that is filled on the occasion of the limitation of wheel brake slip. This reservoir comprises a cylinder, embodied in the manner of a blind bore, as well as a piston that divides a storage chamber from a spring chamber in the cylinder, a spring, and a closure element that prevents water from entering the cylinder if the hydraulic unit should become immersed in water. A pressure equalization conduit begins at the spring chamber and leads into the interior of the motor, so that a displacement of the piston for taking up pressure fluid in the storage chamber is effected essentially only by friction of the piston and forces of the spring. A conduit is also provided, by means of which pressure fluid that emerges from the piston pump at the eccentric can be carried away. The invention proposes connecting the spring chamber of the reservoir to the conduit that carries the pressure fluid away. The spring chamber forms a collection container for pressure fluid, as a result of which the collection of the pressure fluid takes place far away from electrical components of the hydraulic unit, and especially of the motor, thus avoiding electrical defects.

17 Claims, 4 Drawing Sheets

HYDRAULIC UNIT FOR A VEHICLE BRAKE SYSTEM

BACKGROUND OF THE INVENTION

The invention is based on a generic hydraulic unit for a vehicle brake system. From European Patent Disclosure EP 0 621 836 B1, one such generic unit is known that is embodied as immersion-proof. The hydraulic unit has at least one pump that has a piston, and the piston is indirectly drivable by an electric motor via an eccentric that is rotatable inside an eccentric chamber. Because it cannot be precluded that the moving piston may entrain pressure fluid into the eccentric chamber through a sealing ring or the like on the occasion of pump operation, a conduit extends downward from the eccentric chamber and opens to the atmosphere through a housing block that receives the at least one pump; a check valve that can open toward the atmosphere is built into the conduit. Pressure fluid that has been entrained into the eccentric chamber and drips from the piston enters the conduit and stresses the check valve, causing it to open, and finally flows out of the housing block. As a result, filling of the eccentric chamber with pressure fluid is averted, so that pressure fluid remains far away from the electric motor, or in other words does not penetrate the electric motor and impair the operability thereof.

In a hydraulic unit known from International Patent Disclosure WO 96/13416, the electric motor is located above an eccentric chamber, in which the eccentric acting on at least one piston of a pump is rotatable. Once again, a conduit leads downward from the eccentric chamber, directly or indirectly to a so-called central venting point, where an element is installed that is permeable to air but not to water from the environment, so as to equalize the pressure of the eccentric chamber, for instance, relative to the ambient atmosphere and on the other hand to prevent at least splashing water from entering the unit. As an additional provision, the central venting point may have a check valve mentioned in this aforementioned patent disclosure. For instance, a check valve disclosed in the first reference cited, EP 0 629 836 B1, could be used. The unit also has at least one reservoir intended for temporarily receiving pressure fluid; it comprises a cylindrical hollow chamber closed off from the ambient atmosphere, a piston displaceable in the chamber that divides the hollow chamber into a variable storage chamber and a spring chamber, and a spring acting on the piston. The spring is braced on a cap that tightly closes off the hollow chamber. Extending from the spring chamber, adjacent to the cap, a pressure equalization conduit, which leads either upward to an inner hollow chamber in the electric motor or downward to a hollow chamber in a covering hood. The covering hood covers electromagnets of valves of the unit, as well as electrical components that are disposed on a circuit board. In operation of the unit, pressure fluid entrained into the eccentric chamber by a piston of the pump drips directly into the covering hood, for instance, so that it cannot be precluded that electrically operative components will become moistened with the pressure fluid.

OBJECT AND SUMMARY OF THE INVENTION

The characteristics set forth herein offer the advantage that pressure fluid entrained into a cam element chamber, which for instance may be an eccentric chamber, by motions of the piston pump piston, are delivered to the at least one spring chamber, far from electrical components, and collected in that chamber. Because the entrained pressure fluid is collected in the spring chamber, permeable elements at a central venting point as in the prior art, or a check valve as in the prior art, can conditionally be dispensed with. To this extent, the invention yields cost savings as well as the advantage of a hermetic seal of the unit from the environment. The housing block together with the at least one pump can be immersed and submerged, for instance in salty water, without the risk of damage.

With the provisions recited herein, advantageous refinements of and improvements to the hydraulic unit defined are possible.

The characteristics set forth offer the advantage that because of dual utilization of conduit portions, the housing block can be produced economically, on the one hand having fewer conduits and on the other by cleaning these fewer conduits after they have been produced.

The characteristics set forth herein offer the advantage that a housing block, known from EP 0 699 571 A1, for a hydraulic unit of a vehicle brake system can be used without changing its size or its basic internal design, so that the only provision necessary is the disposition of the characteristics set forth hereinafter. The engineer can decide how much pressure fluid entrained by the at least one piston of the at least one pump should be stored. If the hydraulic unit is intended merely to avoid the danger of wheel locking, then the at least one container will be made smaller than if the hydraulic unit is additionally designed for automatic braking and for traction control of driven wheels or for stabilization while driving. This is because automatic braking can involve more-frequent activation of the at least one pump.

The characteristics defined herein offer a practical exemplary embodiment for such containers with recourse to deep-drawing techniques known per se. The characteristics set forth herein offer the advantage that in a favorable way from a production standpoint, the invasion of water between a fastening portion of the container and the housing block is averted.

The features set forth offer the advantage on the one hand that the motor can be delivered complete to an assembly line, along which the motor is moved toward the housing block and fixed to it, and as a further advantage at the same time an intended sealing off against the invasion of water from the environment into the motor and into the cam element chamber located in the housing block is avoided. The characteristics set forth also offer the advantage that the seal can be made in a favorable way from a production standpoint, and because of the resultant geometrical design of the seal, less sealing material is consumed. Since the sealing material can be mounted in the form of a worm of closed circular-annular shape, both the aforementioned sealing and sealing off of the pressure-equalizing conduit relative to the environment are attained by means of such a worm.

The characteristics defined herein bring about a pressure equilibrium between the motor and a covering hood, which contains such electrically operative components as relays or semiconductor elements and which thus also protects electromagnets of valves of the hydraulic unit from the harmful effects of the environment by sealing them off from the environment. Pressure equalization of both the motor interior and the covering hood with regard to the atmosphere is done in a way that is gentle to the unit, by making use of a cable sheath, joined in sealed fashion to the covering hood, and this sheath is terminated at the highest possible point in the vehicle, to avert the risk that water can enter a partially immersed vehicle. To this extent, it is possible to avoid the provision of a pressure equalization hose, which begins at a lowest point of the hydraulic unit and then rises, as disclosed in WO 96/13416, a hose that serves the sole purpose of pressure equalization.

The invention will be better understood and further objects and advantages thereof will become more apparent from the ensuing detailed description of preferred embodiments taken in conjunction with the drawings.

DESCRIPTION OF THE PREFERRED EMBODIMENTS

First Exemplary Embodiment

Figure 3:
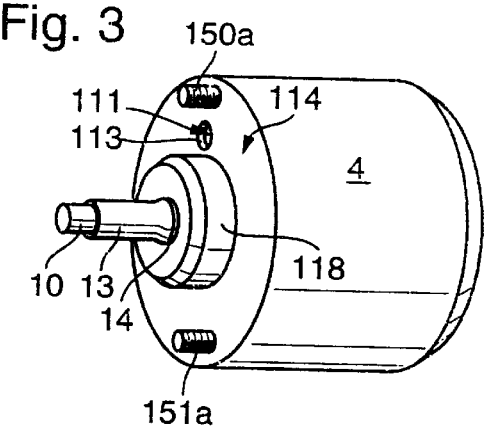
FIG. 3 shows a component of the hydraulic unit in an oblique view.

The hydraulic unit 2 of the invention includes as its essential components a housing block 3 and, mounted against the housing block 3, a motor 4, which is shown only in FIG. 3, as well as a housing 5 and a covering hood 6. Because the hydraulic unit 2 to this extent largely agrees with the hydraulic unit of EP 0 699 571 A1, a relatively brief general description will suffice, so that characteristics essential to the invention will be more apparent.

Figure 1:
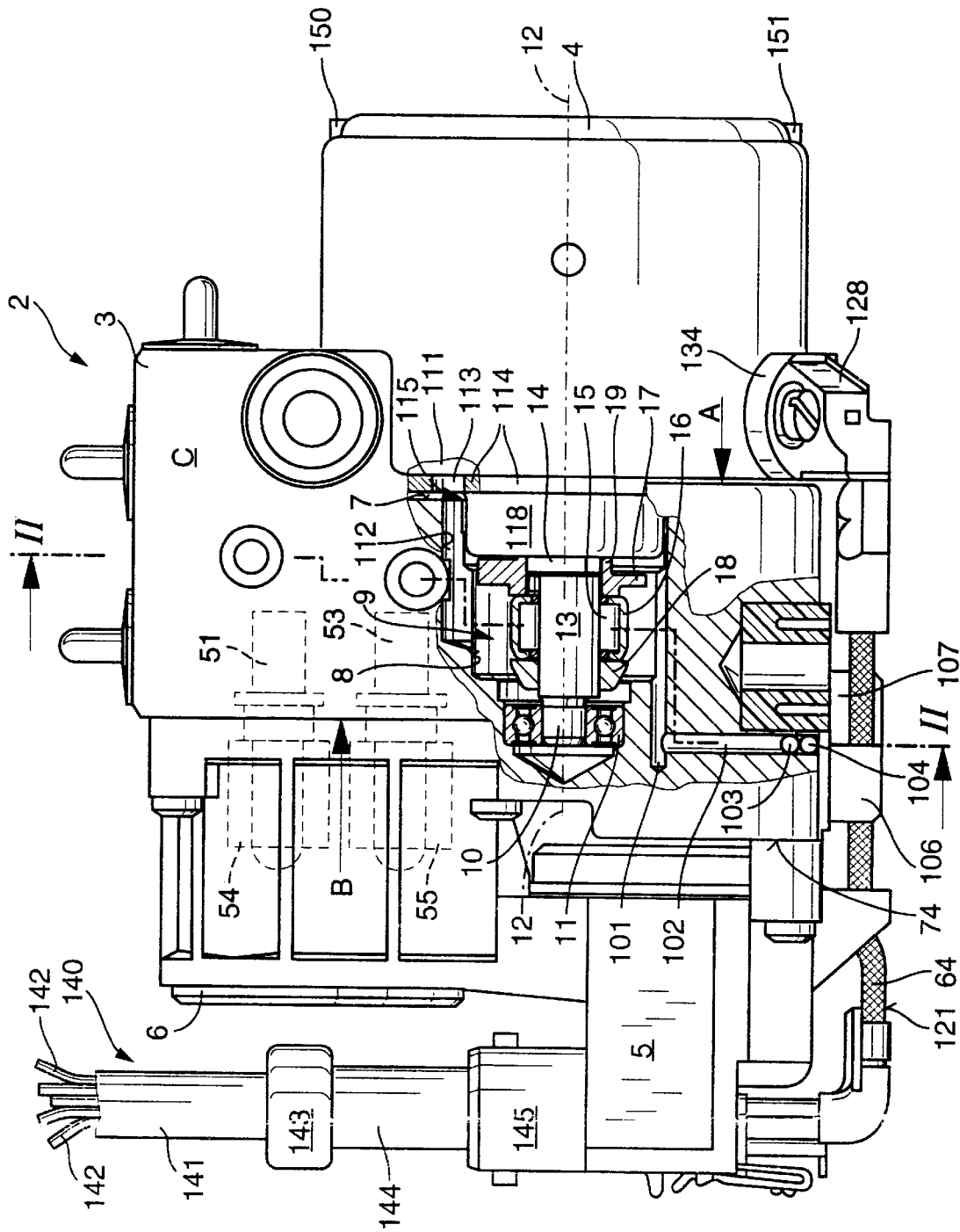
FIG. 1 shows a first exemplary embodiment of the hydraulic unit according to the invention in a side view and partially cut away.
Figure 4:
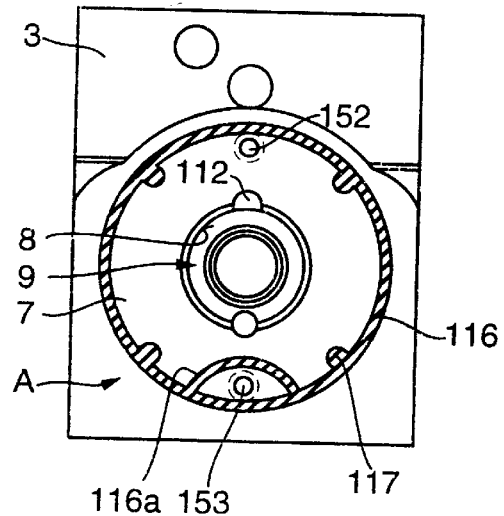
FIG. 4 shows a detail of the hydraulic unit of FIG. 1 in an end view.
Figure 5:
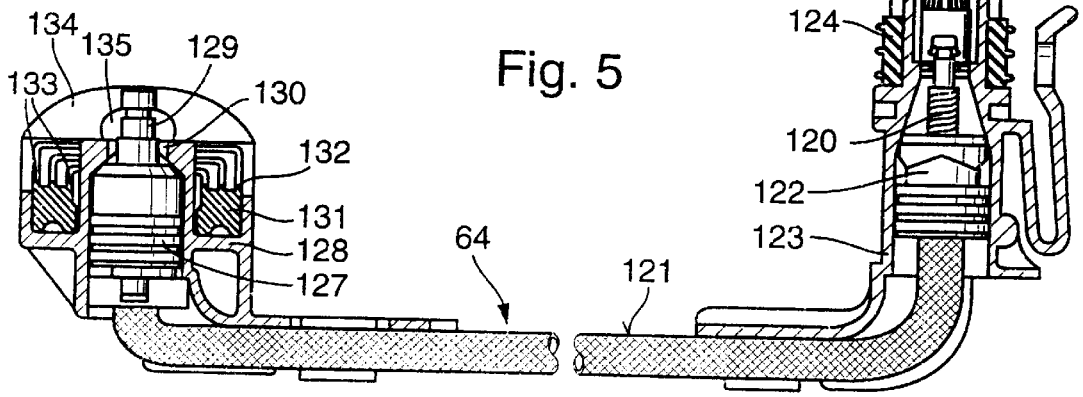
FIG. 5 shows an electrical component in a cutaway view for the unit of FIG. 1.

A securing face 7 for the motor 4 is located on a face end A of the housing block 3, as shown in FIGS. 1 and 4. Extending vertically to this securing face 7 in the housing block 3 is a stepped bore 8, which defines an eccentric chamber 9. A shaft trunnion 10, which by means of a ball bearing 11 that is supported by the stepped bore 8, determines a pivot axis 12 for an eccentric 13 that is embodied integrally with a shaft 14. The shaft 14 extends from the eccentric 13 into the motor 4. The motor may be embodied in a manner not shown as a direct current motor, with an armature and collector that are not shown and may be equipped with contact brushes, also not shown, that are associated with the collector. In addition, it will be noted here that the eccentric 13 shown is a cam element known per se, as well as known swash plates and other cam curves. Accordingly, to avoid unnecessary limitation here, the eccentric is also understood to be a cam element, and correspondingly in an expanded sense a cam element chamber is intended in place of an eccentric chamber 9.

Figure 2:
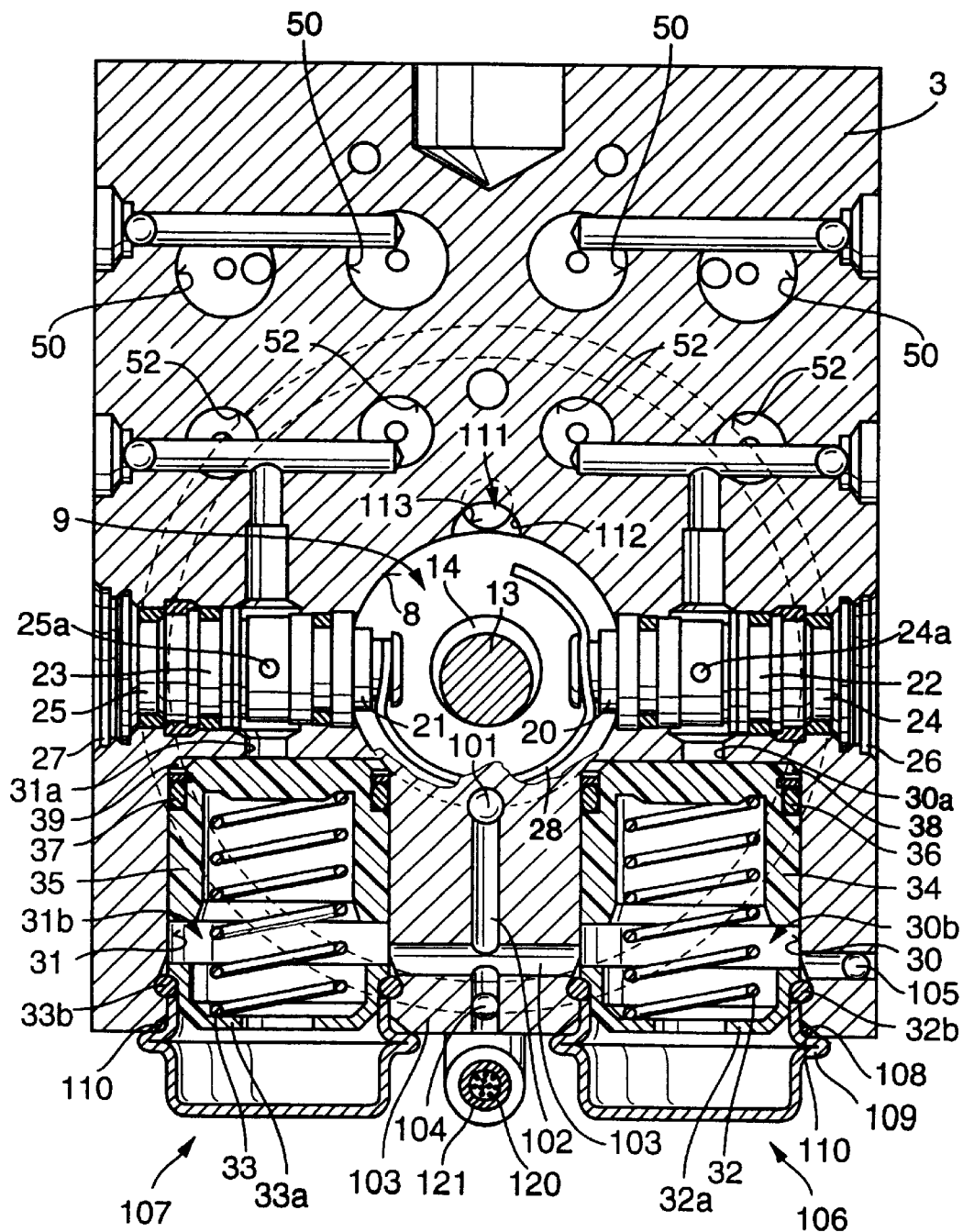
FIG. 2 shows a cross section of the unit of FIG. 1 along line II—II.

A cross section through the eccentric 13 is shown in FIG. 2. In FIG. 2, the shaft 14 adjoining the eccentric 13 behind it can also be seen. In FIG. 3, the sequence of a shaft trunnion 10, eccentric 13 and shaft 14 is clearly shown. Disposed around the eccentric 13 is for instance a needle bearing 15, which is held together by a bearing ring 16. Axial stop means 17, 18 for the bearing ring 16 are provided on both sides of the bearing ring 16. The bearing ring 16 is rotatable relative to the eccentric 13 between these axial stop means 17 and 18. The stop means 17 has a hub 19, which is seated fixedly on the shaft 14. The axial stop means 18 is in the form of an outer conical ring and is press-fitted, firmly seated, onto the eccentric 13. These individual parts are shown in FIG. 1. In FIG. 2, crosswise to the pivot axis 12 of the eccentric 13 and thus coaxially and in mirror symmetry with the eccentric 13, two pump pistons 20, 21 are provided. The pump pistons 20, 21 are displaceable in pump cylinder bores, not shown, that are located in pump cylinders 22 and 23. The pump cylinders 22 and 23 are combined with outlet valves 24 and 25, respectively, thus forming two piston pumps that are operative independently of one another and have inlets 24a and 25a. In a manner known per se, these inlets 24a and 25a are assigned inlet check valves, not shown, inside the piston pumps. The piston pumps 22, 23 are fixed in the housing block 3, for instance by means of caulked features 26, 27. To generate pressure, the pump pistons 20 and 21 are displaceable longitudinally by means of the eccentric 13, which has earlier also been called a cam element, with the interposition of the needle bearing 15 and its bearing ring 16. For displacement in the respective opposite direction, a C-shaped spring clip 28 firmly hooked onto the pump pistons 20 and 21 is used.

In FIG. 2, first cylindrical bores 30, 31, which are drilled vertically from below into the housing block 3 in the manner of blind bores, are located below the elements 20, 22, 24 and 21, 23, 25 of the respective piston pumps 22, 23. In the bores 30 and 31, pistons 34 and 35, so-called storage pistons, that are loaded by springs 32, 33 are provided. Sealing rings 36 and 37, respectively, assure that sealed-off storage chambers 38 and 39 are available, above the pistons 34, 35, for receiving pressure fluid. Connecting conduits 30a and 31a extend upward from the cylindrical bores 30 and 31 and connect the storage chambers 38 and 39 to the inlets 24 and 25a of the two piston pumps 24 and 25. Below the pistons 34 and 35, the cylindrical bores 30 and 31 form spring chambers 30b and 31b. The springs 32 and 33 are retained inside the cylindrical bores 30 and 31 by means of spring plates 32a and 33a, which in turn are braced rigidly in the housing block 3 by means of spring wire rings 32b and 33b. The connecting conduits 30a and 31a communicate with lower stepped bores 52, located above the piston pumps 24, 25, which bores serve to receive multiposition valves 53, shown schematically in FIG. 1, that are actuatable by means of electromagnetic coils 55. The multiposition valves 53 in the exemplary embodiment are so-called brake pressure reduction valves. Also shown in FIG. 2 are upper stepped bores 50, to which in FIG. 1 multiposition valves 51 with electrical coils 54 are assigned. Because the subject of the invention does not pertain to the hydraulic interconnection of multiposition valves with wheel brake cylinders and a master cylinder, further details need not be addressed here.

In a manner according to the invention, first conduit portions 101, 102 and 103 extend downward, beginning at the eccentric chamber or cam element chamber 9. The conduit portion 101 is made in the manner of a bore that intersects the stepped bore 8 at its lowest point and thereby forms a kind of channel and in its further course extends in the form of a cylindrical bore, for instance parallel to the pivot axis 12 of the eccentric 13. The conduit portion 101 ends in the manner of a blind bore. Intersecting the conduit portion 101 and in the process discharging into this conduit portion 101 is the conduit portion 102, which is drilled in from an underside of the housing block 3 and is closed off, adjoining the underside, by means of a ball 104 press-fitted into place. The conduit portion 103 in turn is made in the form of a bore that begins at one side of the housing block 3, intersects the cylindrical bore 30, discharges into the conduit portion 102 and intersecting the latter extends onward, finally discharging into the bore 31. The conduit portions 101–103 form a conduit oriented downward from the cam element chamber 9 and discharging into the spring chambers 30b and 31b. It can be seen that pressure fluid dripping from the ends, visible in FIG. 2, of the pistons 20 and 21 find a path out of the cam element chamber 9 and into the spring chambers 30b and 31b. The pressure fluid dripping off is the same pressure fluid mentioned in the description of the prior art, which on the occasion of the operation of the piston pumps 22 and 23 passes through sealing rings, not shown, or in other words has been entrained between sealing faces.

To prevent dirt and water from penetrating the bores 30, 31 from below, these bores are closed by means of closure elements 106 and 107. In the exemplary embodiment, the closure elements 106 and 107 perform the task both of a cap as in the prior art and the task of catching pressure fluid according to the invention, fluid that has been diverted out of the eccentric chamber 9 by means of the first conduit portions 101, 102 and 103.

The respective closure element 106 and 107 is produced here in the form of a substantially cup-shaped deep-drawn part, next to whose free edge 108 a bead 108 is first disposed, the bead subsequently being upset to form a flangelike axial stop as shown. With the free edge 108 leading, the closure element 106 and 107 is press-fitted into the respective spring chamber 30b and 31b. This already creates a certain sealing, which is supplemented by a sealing element 110, which in a manner that can be selected from the prior art for instance be a prefabricated sealing ring, or a worm of initially liquid silicon rubber, applied before the closure elements 106 and 107 are built in, which over the course of time, changes into a rubber-elastic state. It is shown in FIG. 2 that the upper free edges 108 and these closure elements 106 and 107 are located below the conduit portion 103. To this extent, pressure fluid from the conduit portion 103, for instance, can get into the two bores 30, 31 along the sealing rings 32b, 33b and flow downward into the closure elements 106 and 107. It will be appreciated that the greater the axial length of the closure elements 106 and 107, the more pressure fluid can be received before collected pressure fluid reaches the level at which the conduit portion 103 is disposed. In order that no pressure fluid will reach the outside even from a beginning of a bore portion that belongs to the conduit portion 103, a ball 105 is press-fitted as a closure piece into the housing block 3.

In addition it will be noted that the respective closure elements 106 and 107, each assigned to one of the bores 30 and 31, can be exchanged for a common cap in the manner of a cap shown in European Patent Disclosure EP 0 662 891 B1, which according to FIG. 2 thereof is embodied in substantially tub-shaped fashion and is braced against the housing block with the interposition of a seal. If such a cap is used, then the disposition of the ball 104, the conduit portion 103, and the ball 105 that seals off the conduit portion 103 from the outside, as shown in FIG. 2 of the present application, may be dispensed with.

A generic pressure equalization conduit between at least one spring chamber 30b, 31b and the interior 111 of the motor 4 includes the first conduit portions 101, 102 and 103 and the eccentric chamber or cam element chamber 9 and finally two conduit portions 112 and 113. The conduit portion 113 is embodied as a hole in an end wall 114 of the motor facing toward the housing block 2. The conduit portion 112 is embodied in the manner of a bore cut halfway open, for instance, which intersects the contour of the stepped bore 8 and is embodied in comparable fashion to a portion of the conduit portion 101 that has been described above. Located between the conduit portions 112 and 113 is a conduit portion 115, which is located radially inside a sealing element 116 that is located between the end wall 114 of the motor and the securing face 7 furnished by the housing block 3. In FIG. 4, this sealing element 116 is embodied as extending annularly and is either stamped out of a sealing material or injection molded from it, or preferably, as described for the sealing element 110 of the closure elements 106 and 107, made from an initially liquid sealing material such as silicone rubber by being poured or sprayed onto the securing face 7. A sealing element produced in this way is sometimes also called a sealing worm and here has a thickness, measured in the axial direction of the motor 4, of substantially 2 mm, for instance. Radially inside this sealing element 116, it is possible to dispose support elements 117, which for instance are four in number and for instance are elastic.

It can now be appreciated that beginning at the eccentric chamber 9, the conduit portion 112 extends radially outside a centering attachment 118, which receives a ball bearing not shown and originates at the end wall 114 of the motor extending toward the eccentric 13, between the end wall 114 and the securing face 7 located on the housing block 3 and thus radially inside the sealing element 116, and finally continues in the form of the conduit portion 113 that is formed by a hole in the end wall 114 of the motor. This brings about a pressure equilibrium between the interior 111, that is, a hollow chamber of the motor 4, and the eccentric chamber 9. Together with the first conduit portions 101, 102 and 103 that were described first, a pressure equalization conduit exists between the at least one spring chamber 30b, 31b and the interior 111 of the motor 4; when at least one of the two pistons 34, 35 moves counter to the force of the respective spring 32, 33, the pressure equalization conduit allows air to escape from the respective spring chamber 30b, 31b into the interior 111, the purpose of which is that a displacement resistance of the respective piston 34 or 35 is determined essentially by the force of the respective spring 32, 33. It can be seen that to divert pressure fluid out of the eccentric chamber 9 and for equalizing pressure between the spring chambers 30b and 31b and the interior 111 of the motor, first conduit portions 101, 102 and 103 are utilized in two ways. This provides a cost savings compared with two separately embodied conduits, of which one would be used to carry away pressure fluid and the other would be used for pressure equalization.

Shown in FIG. 1 is a cable 64, which originates at the housing 5 and leads to the motor 4 to supply current to it. The housing 5 is a housing in which a relay, for instance, for switching the electric current for the motor 4 is disposed. In a manner according to the invention, a pressure equilibrium is created between the interior 111 of the motor 4 and the housing 5, which is sealed off relative to the housing block 3. The purpose of pressure equalization is served here by a pressure equalization conduit, which is formed by interstices between wires 120 of the cable 64 and a tubular cable sheath 121 that sheathes the wires 120.

Oriented toward the housing 5, the cable sheath 121 is surrounded by a sealing sleeve 122, which is inserted sealingly into a plug portion 123. The plug portion 123 in turn has a further sealing sleeve 124 on its outside, which becomes operative upon insertion of the plug part 123 into a socket that is located in the housing 5. Contact clips 125 are provided inside the plug part 123 and are electrically connected to the wires 120 by digging into them. It can be seen that because of the embodiment of the contact clips 125 as a bent sheet-metal part with a central portion 126, a flow is possible through the plug part 123, from the contact clips 125, to in between the wires 120 shown and from there on between the wires through the cable sheath 121.

In a comparable way, the cable sheath 121 is introduced into a further sealing sleeve 127, which is located inside a second plug part 128. Instead of the contact clips 125 already described, a plug prong 129 is electrically connected to the wires that extend inside the cable sheath 121. The electrical connection can once again be made in a manner known per se by digging action, to which end the plug prong 129, protruding into the sealing sleeve 127, has a tubular prolongation that is crimped toward the wires 120. To allow a flow of air around the plug prong 129, this prong is aligned by means of centering ribs 130 inside the plug part 128. A contact bush, not shown, is associated with the plug prong 129 inside the motor 4, and a brush holder, also not shown, is for instance connected to the contact bush. The centering ribs 130 extend radially outward from a tubular portion 131. A sealing element 132 that has sealing ribs 133 oriented toward the motor 4 is slipped over this tubular portion 131. To enable the sealing ribs 133 to be pressed sufficiently firmly against the motor 4, fastening tabs 134 with screw holes 135 are formed onto the plug part 128. One fastening tab can be seen in FIG. 1. The screw hole 135 is not visible, because it is covered by the head 136 of a fastening screw.

The cable sheath 121 is connected at least indirectly to the connection cable 140 in a way that equalizes pressure; the connection cable 140 likewise comprises a cable sheath 141 and in this case a plurality of sheathed connection strands 142.

By means of elements 143 and 144, not described in detail, which can be learned from the prior art in electrical connection technology, a connection is made with a sealed plug base 145 located on the housing 5. This prevents water from entering between an end of the cable sheath 141—this end is not visible in the drawing—and the housing 5. In a manner according to the prior art, contact elements not shown are disposed in the plug base 145 and the connection part 144 in such a way that beginning at the connection strands 142, once again air flow possibilities are present, which can be from the cable sheath 141 into the housing 5 or in the opposite direction. The connection cable 140 is extended upward inside the vehicle to the highest possible point, of which it can be assumed that no water will get into it. As a consequence, in an intended way, the cable sheath 141 acts as a pressure equalization conduit between the ambient atmosphere and the interior of the housing 5 and indirectly through the cable sheath 121 for the motor 4 as well.

The provisions described in detail thus directly prevent the invasion of water to the hydraulic unit 2 yet nevertheless provide a pressure equalization of interiors of the hydraulic unit 2 with the ambient atmosphere, and they moreover bring about the diversion of pressure fluid, entrained by pump pistons, into a region of the unit that is located far from vulnerable electrical parts of the hydraulic unit. This prevents electrolytically active ingredients that may be present in the pressure fluid from attacking electrical components or rendering them inoperative.

Second Exemplary Embodiment

Figure 6:
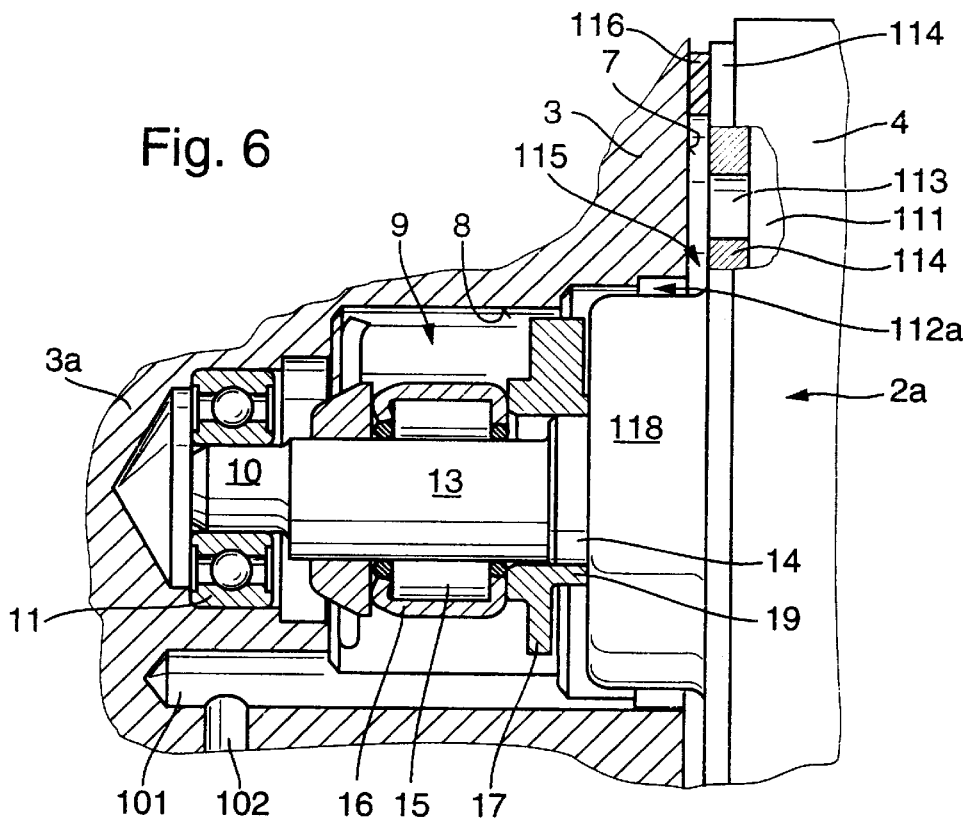
FIG. 6 shows a second exemplary embodiment of the unit of the invention, partly cut away.

The second exemplary embodiment of an anti-lock brake system 2a of FIG. 6 is embodied identically, in terms of the diversion of pressure fluid entrained by pump pistons, to the first exemplary embodiment shown in FIGS. 1, 2, 3 and 4. In FIG. 6, therefore, of the first conduit portions only the conduit portion 101 originating at the cam element chamber 9 and a portion of the length of the conduit portion 102 extending downward from the conduit portion 101 are shown. In a distinction from the first exemplary embodiment, the component 118 here serves the purpose of centrally receiving a ball bearing, not shown. This ball bearing, not shown, is intended to embrace the shaft 14 and thus support it centrally with respect to the motor 4. In the region of the component 118, the stepped bore 8 is therefore embodied such that an annular second conduit portion 112a opens up between this bore and the component 118. In the direction toward the interior 111 of the motor, a further, second conduit portion 115 adjoins it; as in the first exemplary embodiment, this conduit portion extends inside a sealing element 116, between a securing face 7 of a housing block 3a and an end wall 114 of the housing. Once again, a further, second conduit portion 113, which is embodied as a hole in the end wall 114 of the motor, connects the second conduit portion 115 to the interior 111 of the motor 4.

An upper screw head 150 and a lower screw head 151 of two screws 150a and 151a are shown in fragmentary form in FIG. 1, and FIG. 3 they are shown passed through the motor 4 in order to secure it by being screwed into the housing block 3a. To that end, as shown in FIG. 4, two threaded holes 152 and 153 are provided in the housing block. To prevent entrained pressure fluid, which may possible escape from the cam element chamber 9 through the second conduit portion 112a between the securing face 7 and the end wall 114 of the motor, from reaching the threaded hole 115 and thus from flowing along the lower screw 151a to reach the interior of the motor 4, a sealing strip 116a, extending for instance with a uniform curvature, also extends around the threaded hole 153 from the sealing element 116.

In the second exemplary embodiment of FIG. 6, the motor has two bearings for the shaft 14 on either side of an armature, not shown. One of the two bearings is the ball bearing, already mentioned, in the component 118. When such a motor 4 is mounted on the housing block 3a, the centering of the motor relative to the cam element chamber 9 is accomplished when the shaft trunnion 10 is plugged into the ball bearing 11 located in the housing block 3a.

As described for the first exemplary embodiment, here as well the sealing element 116 and the sealing strip 116a can selectively be poured or sprayed from sealing medium or stamped out from a plate.

Third Exemplary Embodiment

Figure 7:
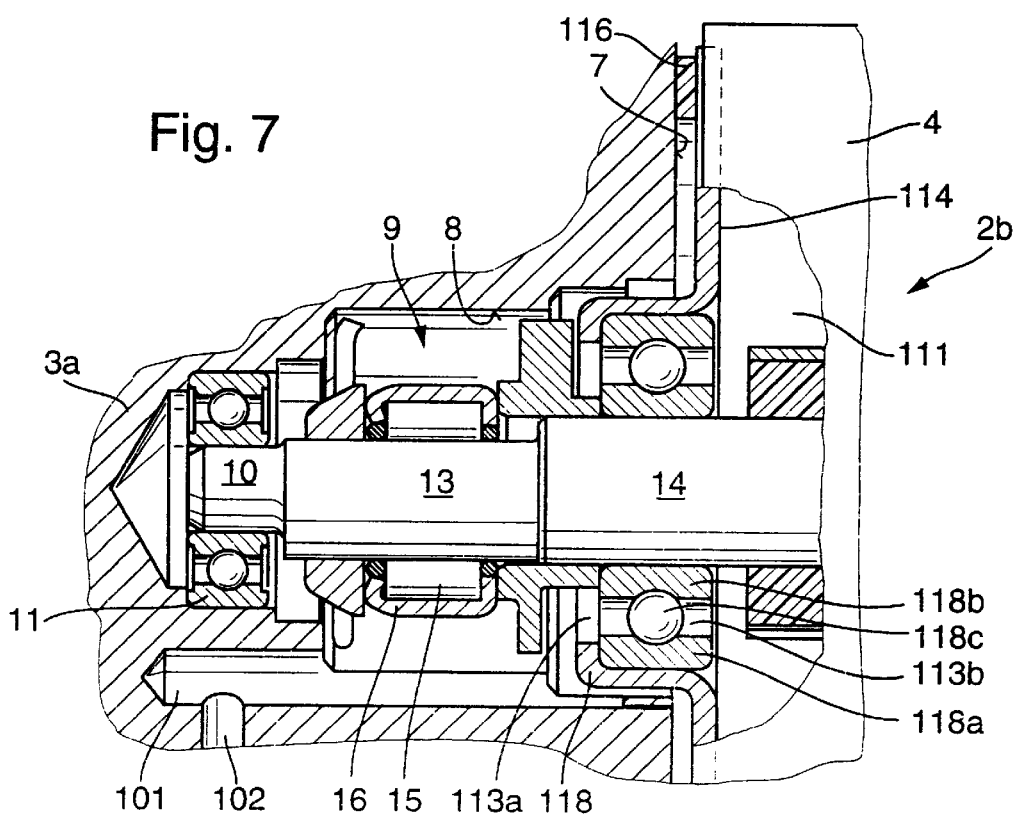
FIG. 7 shows a third exemplary embodiment of the unit of the invention, again partly cut away.

The third exemplary embodiment of the hydraulic unit 2b of the invention as shown in FIG. 7 takes over the housing block 3a of the second exemplary embodiment shown in FIG. 6, for instance, so that entrained pressure fluid, which originates in pump elements 22, 23 and is to be diverted out of the cam element chamber 9, can flow downward through conduit portions 101, 102, far away from the interior 111 of the motor 4.

The pressure equilibrium between the cam element chamber 9 and the interior 111 of the motor is provided by an opening in the component 118 that discharges as a second conduit portion into the cam element chamber 9; this opening forms an annular second conduit portion 113a that surrounds the shaft 14. This second conduit portion 113a is adjoined by a further second conduit portion 113b, which extends between an inner ball bearing ring 118b, embracing the shaft 14 and an outer ball bearing ring 118a that is horizontal relative to the housing block 3a, and in the process extends between bearing balls 118c. Since on the other hand in a manner already described the cam element chamber 9 communicates with the spring chambers 30b and 31b through first conduit portions 101, 102 and 103, a pressure equilibrium between the spring chambers 30b and 31b and the interior 111 of the motor 4 is again possible through the cam element chamber. This third exemplary embodiment makes do without openings, shown in FIGS. 1, 2, 3 and 6, each of them forming one second conduit portion 113, and this makes production cheaper.

In addition it will also be noted that in the third exemplary embodiment of FIG. 7, the second conduit portions 112a, 115 and 113 of the second exemplary embodiment shown in FIG. 6 can also be adopted, for the sake of promoting a pressure equilibrium between the spring chambers 30b, 31b and the interior 111 of the motor 4.

The foregoing relates to preferred exemplary embodiments of the invention, it being understood that other variants and embodiments thereof are possible within the spirit and scope of the invention, the latter being defined by the appended claims.

We claim:

1. A hydraulic unit of a vehicle brake system, comprising a housing block, at least one piston pump inside the housing block with a piston and one cam element that displaces the piston, a cam element chamber in which the cam element is rotatable, a motor for driving the cam element, at least one electrically controllable valve, and at least one reservoir, associated with one inlet of the at least one piston pump, said reservoir comprises a cylinder, a storage piston displaceable in the cylinder, said storage piston divides the cylinder into a variable storage chamber and a spring chamber, a spring which loads the storage piston and is supported indirectly on the housing block, and a closure element that closes the spring chamber relative to the environment, wherein a pressure equalization conduit begins at the spring chamber, leads to the motor, and communicates with the interior thereof, a leakage-diverting conduit (101, 102, 103) that begins at a low point of the cam element chamber (9) and extends to the at least one spring chamber (30b, 31b) and discharges into the at least one spring chamber.

2. A hydraulic unit in accordance with claim 1, in which the pressure equalization conduit comprises at least one first conduit portion (101, 102, 103) below the cam element chamber (9), at least a portion of the cam element chamber (9), and at least a second conduit portion (112a, 113, 113a, 113b, 115), which adjoins the cam element chamber (9), the at least one conduit portion (113) communicates with the interior (111) of the motor (4), and the at least one first conduit portion (101, 102, 103) forming the leakage-diverting conduit.

3. A hydraulic unit in accordance with claim 1, in which the at least one cylinder (30, 31) is oriented with an axis substantially vertically and with the spring chamber (30b, 31b) toward the bottom, and that the at least one closure element (106, 107) is further developed into a cup-shaped collection container.

4. A hydraulic unit in accordance with claim 2, in which the at least one cylinder (30, 31) is oriented with an axis substantially vertically and with the spring chamber (30b, 31b) toward the bottom, and that the at least one closure element (106, 107) is further developed into a cup-shaped collection container.

5. A hydraulic unit in accordance with claim 3, in which the container (106, 107) is embodied as a deep-drawn part with an axial stop (109) and is press-fitted, with a free edge (108) leading, into the respective cylinder (38, 31).

6. A hydraulic unit in accordance with claim 4, in which the container (106, 107) is embodied as a deep-drawn part with an axial stop (109) and is press-fitted, with a free edge (108) leading, into the respective cylinder (38, 31).

7. A hydraulic unit in accordance with claim 5, in which a sealing element (110) shaped preferably from liquid silicone rubber, is disposed between the axial stop (109) and the housing block (3, 3a).

8. A hydraulic unit in accordance with claim 1, in which the motor (4) has an end wall (114), oriented toward the housing block (3, 3a), an opening that forms a second conduit portion (113, 113a, 113b) being located in said end wall, and that radially outside a boundary of the opening, a sealing element (116) is disposed between the end wall (114) and the housing block (3).

9. A hydraulic unit in accordance with claim 2, in which the motor (4) has an end wall (114), oriented toward the housing block (3, 3a), an opening that forms a second conduit portion (113, 113a, 113b) being located in said end wall, and that radially outside a boundary of the opening, a sealing element (116) is disposed between the end wall (114) and the housing block (3).

10. A hydraulic unit in accordance with claim 8, in which the sealing element (116) is in a form of a closed circular-annular application of a liquid silicone rubber sealing agent, which changes into a rubber-elastic state.

11. A hydraulic unit in accordance with claim 9, in which the sealing element (116) is in a form of a closed circular-annular application of a liquid silicone rubber sealing agent, which changes into a rubber-elastic state.

12. A hydraulic unit in accordance with claim 1, in which an electrical cable (24) comprising wires (120) with a waterproof cable sheath (121) with voids between the wires begins at the motor (4) and leads to a housing (5) flanged to the housing block (3, 3a), and that the waterproof cable sheath (121) is sealed off at least indirectly relative to a housing portion of the motor (4) and the housing (5), and the cable sheath (121) forms a pressure equalization conduit between the interior (111) of the motor (4) and the interior of the housing (5).

13. A hydraulic unit in accordance with claim 2, in which an electrical cable (24) comprising wires (120) with a waterproof cable sheath (121) with voids between the wires begins at the motor (4) and leads to a housing (5) flanged to the housing block (3, 3a), and that the waterproof cable sheath (121) is sealed off at least indirectly relative to a housing portion of the motor (4) and the housing (5), and the cable sheath (121) forms a pressure equalization conduit between the interior (111) of the motor (4) and the interior of the housing (5).

14. A hydraulic unit in accordance with claim 8, in which an electrical cable (24) comprising wires (120) with a waterproof cable sheath (121) with voids between the wires begins at the motor (4) and leads to a housing (5) flanged to the housing block (3, 3a), and that the waterproof cable sheath (121) is sealed off at least indirectly relative to a housing portion of the motor (4) and the housing (5), and the cable sheath (121) forms a pressure equalization conduit between the interior (111) of the motor (4) and the interior of the housing (5).

15. A hydraulic unit in accordance with claim 9, in which an electrical cable (24) comprising wires (120) with a waterproof cable sheath (121) with voids between the wires begins at the motor (4) and leads to a housing (5) flanged to the housing block (3, 3a), and that the waterproof cable sheath (121) is sealed off at least indirectly relative to a housing portion of the motor (4) and the housing (5), and the cable sheath (121) forms a pressure equalization conduit between the interior (111) of the motor (4) and the interior of the housing (5).

16. A hydraulic unit in accordance with claim 10, in which an electrical cable (24) comprising wires (120) with a waterproof cable sheath (121) with voids between the wires begins at the motor (4) and leads to a housing (5) flanged to the housing block (3, 3*a*), and that the waterproof cable sheath (121) is sealed off at least indirectly relative to a housing portion of the motor (4) and the housing (5), and the cable sheath (121) forms a pressure equalization conduit between the interior (111) of the motor (4) and the interior of the housing (5).

17. A hydraulic unit in accordance with claim 11, in which an electrical cable (24) comprising wires (120) with a waterproof cable sheath (121) with voids between the wires begins at the motor (4) and leads to a housing (5) flanged to the housing block (3, 3*a*), and that the waterproof cable sheath (121) is sealed off at least indirectly relative to a housing portion of the motor (4) and the housing (5), and the cable sheath (121) forms a pressure equalization conduit between the interior (111) of the motor (4) and the interior of the housing (5).

* * * * *